United States Patent [19]

Forkert et al.

[11] Patent Number: 5,016,187

[45] Date of Patent: May 14, 1991

[54] LINEARIZED TURBINE FLOW METER FOR FUEL DISPENSERS

[75] Inventors: Maurice J. Forkert; Mark E. Sullivan, both of Fort Wayne, Ind.

[73] Assignee: Tokheim Corporation, Fort Wayne, Ind.

[21] Appl. No.: 298,040

[22] Filed: Jan. 17, 1989

[51] Int. Cl.[5] .......................... G01F 1/12; G06F 15/20
[52] U.S. Cl. ............................... 364/510; 364/571.04; 364/573; 73/861.77
[58] Field of Search ............. 364/571.04, 570, 571.01, 364/571.02, 573, 465, 509, 510, 577; 73/3, 861.77, 861.78, 861; 377/47, 50

[56] References Cited

U.S. PATENT DOCUMENTS

| 3,965,341 | 6/1976 | Honey et al. | 364/510 |
|---|---|---|---|
| 4,290,538 | 9/1981 | White et al. | 364/465 |
| 4,306,457 | 12/1981 | Fukui et al. | 73/861.77 |
| 4,309,909 | 1/1982 | Grebe, Jr. et al. | 73/861.77 |
| 4,353,118 | 10/1982 | Heimgartner et al. | 73/861 |
| 4,410,949 | 10/1983 | Huellinghorst et al. | 364/465 |
| 4,433,583 | 2/1984 | Kirk | 73/861.77 |
| 4,581,713 | 4/1986 | Fennel | 364/571.04 |
| 4,581,946 | 4/1986 | Kanayama | 73/861.77 |
| 4,694,681 | 9/1987 | Hoffman | 73/3 |
| 4,720,800 | 1/1988 | Suzuki et al. | 377/50 |
| 4,790,195 | 12/1988 | Feller | 73/861.77 |
| 4,885,943 | 12/1989 | Tootell et al. | 364/510 |

FOREIGN PATENT DOCUMENTS

1108295  9/1981  Canada .................. 73/861.77

Primary Examiner—Kevin J. Teska
Assistant Examiner—Michael Zanelli
Attorney, Agent, or Firm—Jeffers, Hoffman & Niewyk

[57] ABSTRACT

The present invention is a linearized flow meter apparatus. A turbine flow meter measures a liquid flow and a processor corrects measurement errors and provides an adjusted number of output pulses. The processor uses an endpoint displacement method to provide the corrected output pulse signals.

15 Claims, 3 Drawing Sheets

LINEARIZED TURBINE FLOW METER FOR FUEL DISPENSERS

BACKGROUND OF THE INVENTION

The field of the invention is that of meters for measuring liquid flow. More specifically, the field is that of turbine meters for fuel dispensers.

Various devices are known in the art for measuring liquid flow. One type of meter which is commonly used in fuel dispensers is a piston type of positive displacement meter. Piston meters require a chamber to accept and then exhaust a liquid. Often the chamber size needed to accommodate the piston meter is a limiting factor for liquid dispensing device, particularly in fuel dispensing installations.

A turbine or rotor meter is another type of liquid flow meter. The turbine meter has, in effect, a small fan or rotor placed within a liquid line. The liquid flow then drives the fan with the fluid flow pressure turning the fan. The rotational velocity of the fan is roughly proportional to the rate at which liquid flows through the meter. The rotational velocity is converted into a train of pulses by a transducer. The pulse rate if therefore roughly proportional to the flow rate.

Turbine meters, due to their small size, are well suited for fuel dispensing devices. However, problems exist with the use of turbine meters. Turbine meters exhibit non-linear behavior, because the observed rotational velocity of the fan is not exactly proportional to the amount of liquid passing through the meter for all rates of fluid flow. At slow and fast flow rates, a turbine meter is therefore often inaccurate. Fuel dispensing devices have little tolerance for erroneous measures; thus to utilize a smaller turbine meter, its measuring error must be corrected.

An example of a prior art instrument for error compensation in a flow meter is found in U.S. Pat. No. 3,965,341 (Honey). Honey describes a flow rate computer which corrects the measured flow rates for liquids having a wide range of viscosities. The Honey flow rate computer uses pre-programmed values taken from a "universal flow meter curve" to correct observed flow rates for various viscosities. It uses a curve which plots correction values against frequency divided by viscosity.

Another instrument is described in U.S. Pat. No. 4,306,457 (Fukui). The Fukui device uses a predetermined table matching rotations per second with an error offset value. The circuit described in the Fukui patent measures the number of rotations which occur during a predetermined interval. It does not estimate the error reduction factor for any point between the number of rotations listed on its table (e.g. 2, 2.5, 3, etc.).

A third instrument for error compensation for a flow meter is described in U.S. Pat. No. 4,581,946 (Kanayama). The Kanayama device performs a form of linear interpolation derived from a predefined flow rate curve. The flow rate curve plots an error coefficient against flow rate. A linear approximation of the flow rate curve is generated by a sum of the least squares analysis. In this manner, the Kanayama device estimates the actual flow rate on the basis of the measured flow rate from the flow meter. However, the Kanayama device uses only one of a predetermined set of predefined compensation constants to correct the measured flow rate.

What is therefore needed is a simple, yet accurate, linearization apparatus which can be used with a turbine flow meter. Also what is needed is a turbine flow meter which reliably determines the flow rate from a set of output pulses which defines the frequency. An additional need is for a flow meter which is adaptable to changing conditions and to a variety of dispensers.

The prior art lacks a small rotory meter which gives accurate results. Also lacking is a method for correcting non-linear output which both accurately measures flow rates and robustly adapts to changing conditions.

BRIEF SUMMARY OF THE INVENTION

The turbine flow meter of the present invention provides several advantages over the prior art. By linearizing its output pulses, the meter has greater accuracy at low and high flow rates. By utilizing a rotary flow meter rather than a positive displacement meter, the present invention lessens the space required to house the meter. In addition, the ability to dynamically change calibration values provides a more robust meter which can adapt to changing conditions and maintain its accuracy. These and other advantages will become apparent from the following disclosure of the present invention.

One object of the present invention is to provide a linearized turbine flow meter. Another object of the present invention is to provide a linearizing device which operates according to output pulses generated by the turbine flow meter. Still another object of the present invention is a flow meter which can be used with a variety of dispensers.

The present invention is an apparatus for correcting the measured flow rate of a turbine flow meter in a fuel dispensing apparatus. The present invention includes a turbine flow meter which is adapted to measure the flow rate of a liquid by the rotational velocity of its rotor. Additionally coupled to the flow meter is an output means which generates pulses at a rate proportional to the rotational velocity of the turbine meter.

The present invention also includes a memory for storing calibration values from the flow meter calibration curve and which is coupled to a processor. The processor determines the exact correction factor needed to adjust the measured pulse signals to a true reading. The processor first determines in which interval the measured frequency occurs, then calculates the relative displacement of the measured frequency within that interval. The processor calculates a new correction factor on the basis of the calibration values at the endpoints of the interval and the displacement of the measured frequency within the interval.

Thus, the present invention describes a method of linearizing the output signal of a non-linearly responsive flow meter.

DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views of the drawings.

The exemplifications set out herein illustrate a preferred embodiment of the invention, in one form thereof, and such exemplifications are not to be construed as limiting the scope of the disclosure or the scope of the invention in any manner.

DETAILED DESCRIPTION OF THE PREFERRED EMBODIMENT

Figure 1:
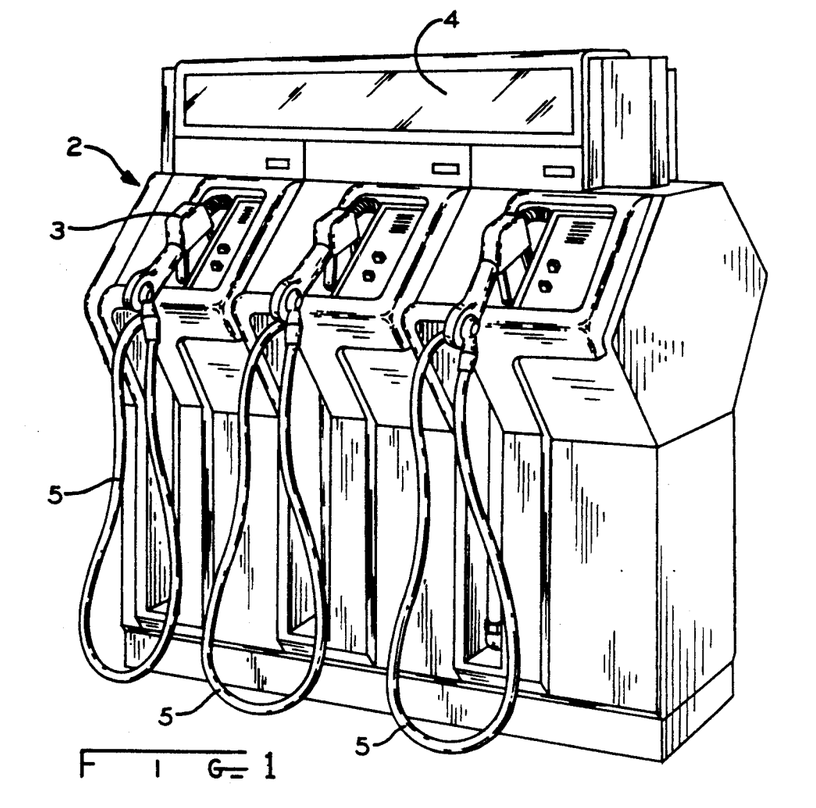
FIG. 1 shows the fuel dispensing apparatus of the present invention.

FIG. 1 shows a representation of a fuel dispensing apparatus compatible with the linearized turbine flow meter according to the present invention. Fuel dispenser 2 is shown having three fuel dispensing lines 5 and having a display 4. Display 4 is used to show the amount of fuel which has been provided by the pump nozzles 3 of fuel dispenser 2. To dispense fuel from fuel dispenser 2, the user takes a pump nozzle 3 and places it in a fuel receptacle. By squeezing the nozzle trigger, the user begins the fuel flow. A pump of fuel dispenser 2 creates a flow in the fuel dispensing line 5. The display 4 typically shows the amount of fuel dispensed and the cost thereof. The amount of fuel is determined as a function of output pulses of a flow meter within fuel dispenser 2. The cost is the product of the amount and the fuel price. Often, the user varies the flow rate by manipulating the nozzle trigger, typically as fast as possible initially then relatively slowly when the fuel receptacle is almost full.

Lawful operation of a fuel dispensing apparatus requires that the apparatus measures the liquid dispensed with particular accuracy. To most efficiently accomplish that goal, a turbine flow meter is used to minimize the space required for the flow meter inside of the fuel dispenser 2. The present invention provides for a small turbine meter to give accurate flow measurements for both fast and slow flow rates. It also allows for reprogramming the calibration equipment to adjust to the changing conditions of the fuel dispenser. These features as well as others will become apparent in the following description of the present invention.

Although the preferred embodiment of the present invention describes a flow meter in a fuel dispensing device, the present invention need not be limited to that embodiment. The present invention could be a portable device used for situations requiring a small but accurate flow meter. Also, the flow meter could be permanently installed as in a fuel dispensing device pictured in FIG. 1. Thus, the present invention is adaptable to a variety of applications.

Figure 2:
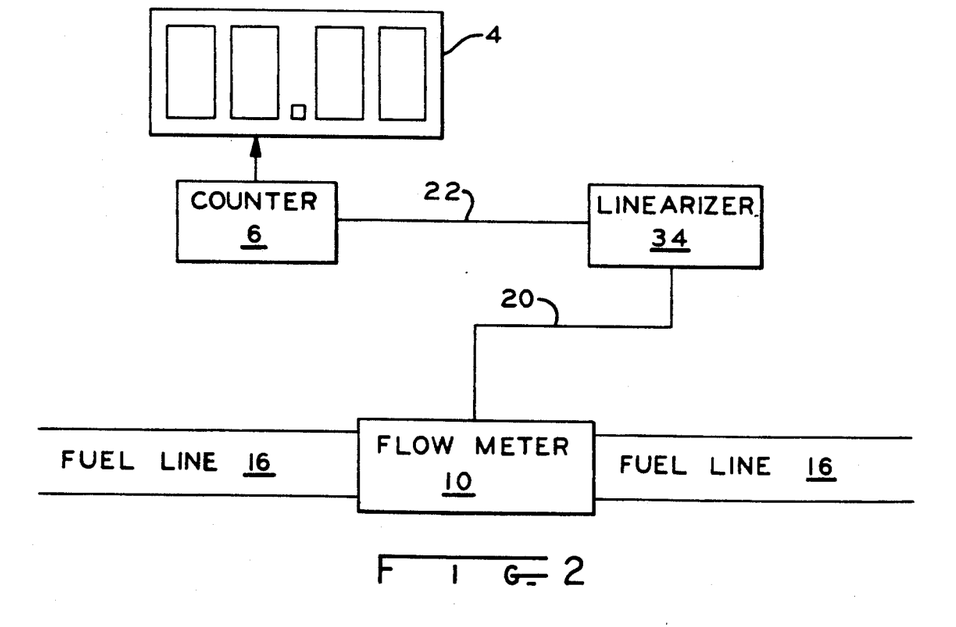
FIG. 2 is a schematic organizational diagram of the linearizing components of the present invention.

FIG. 2 shows a schematic diagram of the flow measurement system of the present invention. A fuel line 16 is used to dispense fuel. Coupled with fuel line 16 is flow meter 10. Flow meter 10 is equipped such that it provides output signals in proportion to the rotational velocity of the fan or rotor of the turbine meter. Those output pulses are sent along input pulses line 20.

Linearizer 34 receives the input pulses from the flow meter 10. Within the linearizer, the input pulses are corrected using correction factors to produce an accurate stream of output pulses. These output pulses reflect the true volume of liquid dispensed through fuel line 16. In addition to receiving input pulses from input pulses line 20, linearizer 34 also sends output pulses, on linearized output pulses line 22, to counter 6.

Counters like counter 6 are well-known in the art. The counter 6 receives a number of input pulses which it converts to a number signifying the amount of liquid volume which has passed through fuel line 16. Its first step is to receive pulses from linearized output pulses line 22. Then counter 6 totals the pulses received and generates a representation of the amount of liquid which has been dispensed through fuel line 16. The counter 6 is coupled to display 4 and drives display 4 to show the amount of liquid measured. Display 4 can be any one of a number of devices well known in the art for projecting graphic information.

The present invention provides a linearizing flow meter which produces an adjusted set of pulses, allowing counter 6 to accurately determine the amount of flow through fuel line 16. The flow meter 10 is depicted in greater detail in FIG. 3. The linearizer 34 is depicted in greater detail in FIG. 4.

Figure 3:
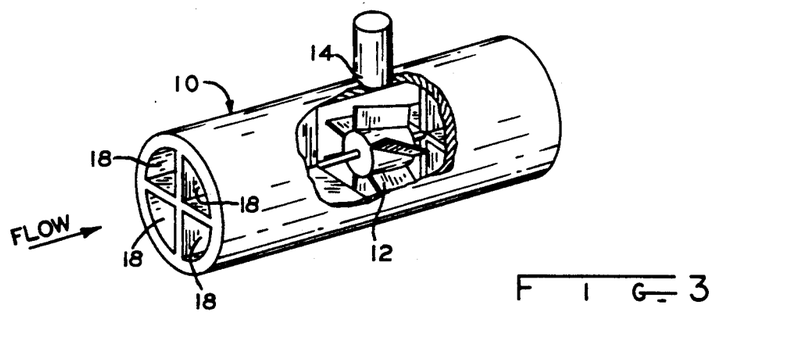
FIG. 3 is a sectional view of the turbine flow meter of the present invention.

The flow meter 10, depicted in FIG. 3, comprises a flow channel 18, a rotor 12, and a pickup assembly 14. The flow meter 10 is a standard type of turbine flow meter, which directs a liquid line through a flow channel 18 having a rotor or fan. The rotor 12 covers the flow area such that any liquid flow causes the rotor to move. The pickup assembly 14 is placed close to rotor 12 so that assembly 14 can sense the movement of rotor 12, but is out of the rotational path of rotor 12 so as not to inhibit the rotor movement. Thus, pickup assembly need not be physically attached to flow channel 18.

Liquid flow through the flow meter 10 turns the rotor 12. The pickup assembly 14 senses the rotary movement of rotor 12 and emits pulses. The output pulse frequency is proportional to the rotational velocity observed on rotor 12. Typically, the pickup assembly 14 is comprised of a magnetic device which senses each rotation of the rotor 12 and sends one or more pulses for each such rotation or numbers of rotations.

A variety of shapes and sizes of turbine flow meters can be used with the present invention. The flow meter must have a means to measure the rotor's velocity. Also, an ability to prove the flow meter is necessary for the practice of the present invention. Without proving ability, a calibration curve cannot be derived.

Figure 4:
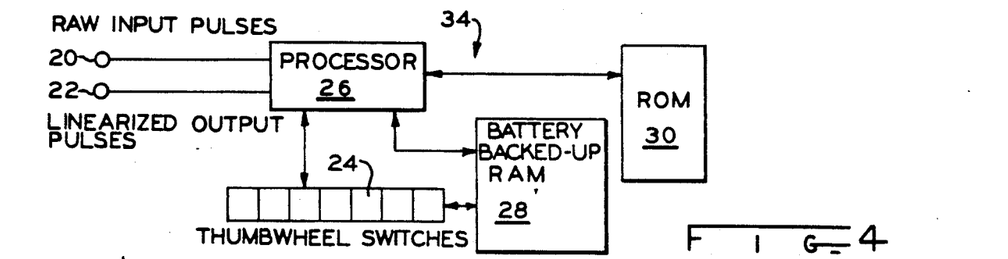
FIG. 4 is a schematic diagram of the linearizer of the present invention.

The flow meter pickup assembly 14 sends pulses over raw input pulses line 20 to linearizer 34. A schematic diagram of linearizer 34 is shown in FIG. 4. A processor 26 receives input pulses via raw input pulses line 20. The processor 26 then determines a linearized output which it sends on linearized output pulses line 22. To accomplish this, processor 26 is coupled to thumbwheel switches 24, random access memory (RAM) 28, and read only memory (ROM) 30. Additionally, thumbwheel switches 24 and RAM 28 are coupled. The processor 26, in the preferred embodiment, has machine instructions stored in read only memory (ROM) 30. The processor also has a number of correction values stored in random access memory (RAM) 28. Thumbwheel switches 24 operate to input new correction values in RAM 28 when enabled by processor 26.

The preferred embodiment of the present invention uses a battery backed-up random access (RAM) memory. However, the use of many types of electronic memory is practicable with the present invention. Such memories include read only memories (ROM), electronically programmable read only memories (EPROM), magnetic bubble memory, erasable electronically programmable read only memories (EEPROM) or any other non-volatile memory. Volatile memories (e.g. ordinary RAMs) can be used, but the meter would lose the correction values when a power interruption occurs. However, programmable non-volatile memories allow dynamic change of the correction values.

To set the endpoints and their associated calibration values, a number of methods can be used. The preferred embodiment of the present invention has six endpoint values implicitly defined by the program stored in the ROM 30. The correction values associated with these endpoint values are stored in the RAM 28. The six correction values can be changed by using thumb wheel switches 24.

The preferred embodiment of the present invention has seven thumb wheel switches with an additional switch or button. Six of the thumb wheel switches specify the correction value to be entered. The seventh thumb wheel switch specifies which of the six endpoints to associate the correction value with. An additional feature involves the ability to offset all six correction values by the amount specified on the first six thumb wheel switches. This feature is useful when changing conditions uniformly shift the calibration curve a certain amount from its predefined values. Thus, by offsetting all by a uniform amount, the six correction values can be corrected instantly. Altering memory according to the seven thumb wheel switches occurs by depressing a button which is located near the thumb wheel switches.

The preferred embodiment has thumb wheel switches 24 coupled both to processor 26, the switches' driver, and RAM 28, the switches' depository. A human operator can enter correction values for the various interval endpoints on the thumb wheel switches 24, the correction values to be stored in RAM 28. Because the thumb wheel switches 24 do not contain any microprocessing circuitry, the processor 26 must store the correction values to RAM 28.

This embodiment having ROM, RAM, and thumbwheel switches is only one configuration of the present invention. Any one of a number of data entry devices can be used within the teachings of the present invention. To practice the present invention, it is only necessary to have a processor having access to memory for storing the correction values. However, having a microprogram in the ROM greatly facilitates performance of the correct linearization calculations. The preferred embodiment uses a 80C31 chip made by Intel of Santa Clara, Calif. The appendix to this specification is a copy of micro code for the processor of the preferred embodiment, compiled by ASM 51.

Figure 5A:
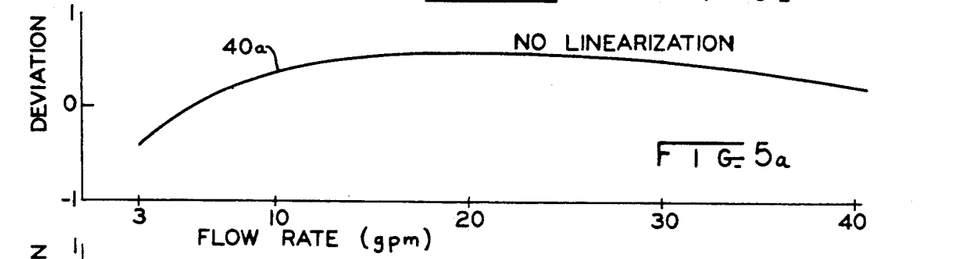
FIG. 5a is a graph depicting the deviation curve with no linearization.
Figure 5B:
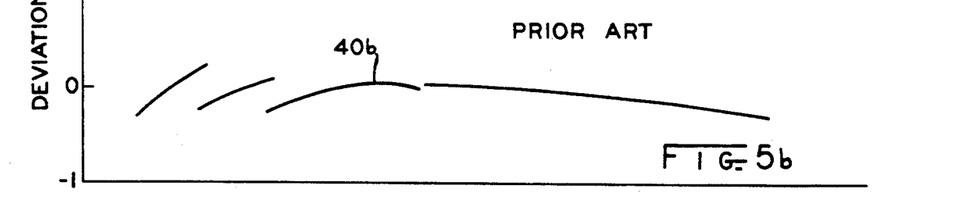
FIG. 5b is a graph depicting the deviation curve with prior art linearization.
Figure 5C:
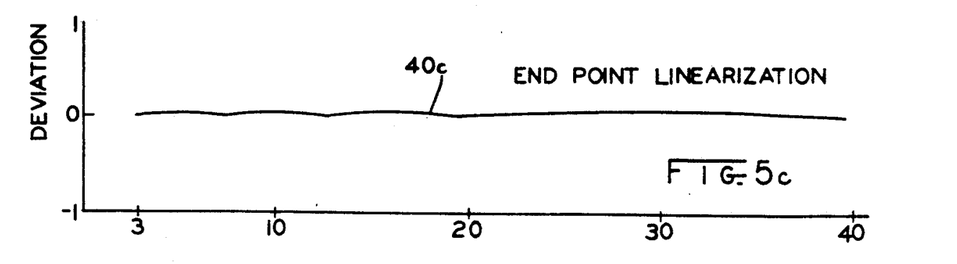
FIG. 5c is a graph depicting the deviation curve with the end point linearization of the present invention.

The linearization of the present invention is graphically depicted in FIG. 5. The graphs of FIG. 5 show deviation as a function of flow rate (measured by the frequency of pulses by pickup assembly 14). Deviation expresses the over- or under-estimation of the actual amount of liquid to have passed through the flow meter. A deviation of zero shows an exactly accurate measurement of the liquid flow. A value of 1 indicates the measured flow rate was twice the actual flow rate. Similarly, a deviation of negative one-half shows the measured flow rate was one-half the actual flow rate.

Graph A of FIG. 5 shows the actual error of a typical turbine flow meter. A typical deviation curve is shown as measurement error curve 40a. The flow meter detects no liquid flow until the flow rate is approximately 3 gallons per minute (gpm). At 3 gpm, the flow meter under-estimates the actual liquid flow by a significant degree, thus numerically the deviation is a negative fraction. As the flow rate increases from approximately 3 gpm to 40 gpm, the deviation goes from under-estimation to over-estimation. From 40 gpm and above the deviation stays at approximately the same positive fractional value, i.e. over-estimating the flow rate.

Graph B of FIG. 5 shonws a prior art method of linearization of the curve depicted in Graph A. By segmenting measurement error line 40a into differing intervals and attempting to linearizer each interval, the average deviation of measurement error 40b decreases compared to the no linearization case of 40a. However, looking to Graph C of FIG. 5, it is apparent that the endpoint linearization shown as measurement error 40c further decreases the total deviation. Thus the present invention produces a more accurate measurement of the turbine meter flow rate. The method used to construct FIG. 5 will become apparent upon consideration of the endpoint linearization and the flow chart of FIG. 6.

To linearize a deviation curve, the curve is divided into intervals and then each interval is interpolated to produce a set of lines which estimate the deviation curve. The intervals are determined by an empirical method which selects portions of the deviation curve that are relatively linear within the interval. Alternately, intervals could be evenly spaced. Even spacing works well for large numbers of small intervals. However, a large number of intervals requires increased storage and computation time. Preferably, a small number of intervals is chosen each having a reasonably linear curve within each interval. Any suitable method of interval selection can be used.

Within each interval, the deviation curve is interpolated to produce a straight line estimating the deviation curve within the interval. The present invention uses an endpoint linearization method. This assumes that the correction factor for any measured frequency lies on the line between the immediately lower and higher endpoints. Other methods of linear interpolation, such as the least sum of the squares method or an empirical method, can be used. However, any change in calibration of the flow meter would require extensive recalculation to adapt those other methods. For the endpoint linearization method, only recalibration at the interval's endpoints is needed. Also, if the selected endpoints are located at the usual operating speed of the flow meter, the endpoint linearizating is both more accurate and more robust. Thus, endpoint linearization exhibits the preferred behavior. The endpoint linearization algorithm is expressed in correction factor change section 72 of FIG. 6.

Figure 6:
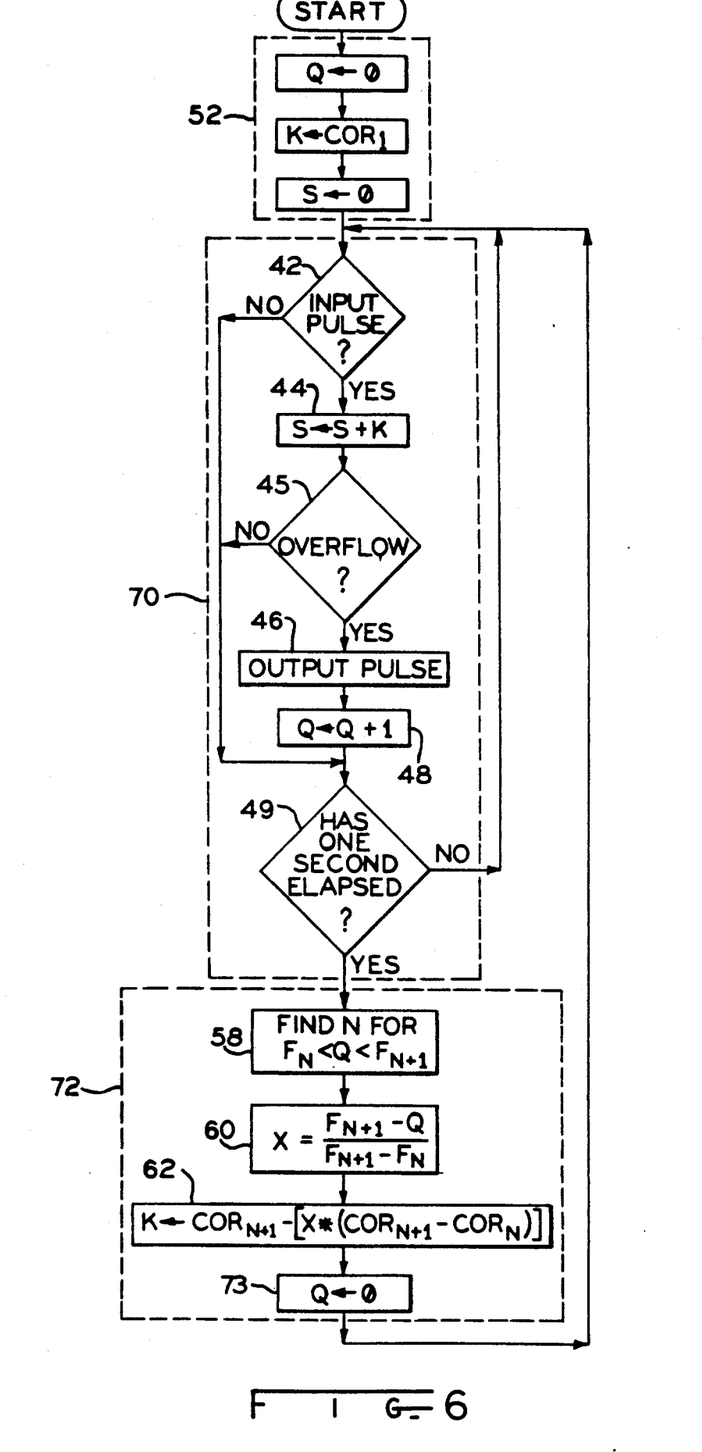
FIG. 6 is a flow chart diagram of the linearization method of the present invention.

Linearization flow chart of the present invention is depicted in FIG. 6. The flow chart 50 shows the algorithm that processor 26 executes when the fuel dispenser 2 dispenses fuel. The algorithm operates upon four variable quantities, a set of frequency endpoints, and correction factors associated with those endpoints. In the algorithm, the four variables are Q, K, S, and X. Q represents the rate of flow by counting the number of pulses per second. K represents the current correction factor which is used to determine when an output pulse should be sent. S represents the sum of the correction factors and it never exceeds one, although in the process of summing correction factors overflow can occur which causes an output pulse. X represents the displacement within the selected interval of the latest measured frequency. Also, the Nth frequency is denoted by $F_N$ and the correction factor associated with that frequency is denoted by $COR_N$.

The first step of the flow chart is initialization 52. In step 52, both Q and S are assigned the value of 0 because they are used as counters. K is assigned the correction value associated with the endpoint having the smallest frequency because K must have an initial value for the algorithm to operate predictably. The correction value associated with the lowest endpoint is selected as K's initial value because typically the initial flow is relatively slow.

After initialization 52, the algorithm begins its input loop 70. Input loop 70 is a busy-wait type of loop that cycles approximately once per second to recalculate the value of the correction factor. The first step of input loop 70 is input pulse check 42 where the processor checks for the recent occurrence of an output pulse from flow meter 10. If no recent output pulse has occurred, the process proceeds to cycle check 49, described below. If a recent output pulse has occurred, the processor proceeds to correction summing step 44.

In step 44, the value of S is incremented by the value of K. That incrementing causes overflow if the sum would be greater than or equal to one, although the value of S never exceeds one. After correction summing 44, the processor checks for overflow in overflow check step 45. If no overflow occurred in step 44, then the processor proceeds to cycle check 49, described below. If overflow occurred, then outputs pulse step 46 is executed.

Overflow occurs whenever the value of S+K equals or exceeds 1. For example, assuming S=0.743 and K=0.674, the actual value of S+K is 1.417. However in step 44 S is assigned the value of 0.417, and an overflow flag is set. In step 45, the processor checks the overflow flag to determine if sending an output pulse is appropriate. If the overflow flag is set, then the processor clears the flag and proceeds to execute step 46. However, upon finding the overflow flag clear, the processor branches to cycle check step 49.

The processor sends an output pulse in output pulse step 46. Next, is pulse counting step 48 where the variable Q is incremented by one. The final step in input loop 70 is the previously mentioned cycle check step 49 where the processor determines whether a second has transpired since the start of the current iteration of input loop 70. If a second has not transpired, then the input loop 70 restarts by execution of input pulse check 42. If a second has transpired then the processor executes correction factor change section 72.

The correction factor change section 72 is executed approximately once per second. Its purpose is to select the appropriate correction factor to use in the next iteration of input loop 70. The procedure shown in correction factor change section 72 is one embodiment of the endpoint linearization method, with other equivalent methods also existing. The first step of section 72 is interval selection step 58.

In step 58 the estimated frequency is used to select the appropriate interval for calculating the new correction factor. The interval is selected such that the estimated frequency Q (for Q pulses per second) lies directly between a lower endpoint and a higher endpoint, both of which have an associated correction value. The lowest interval is the fringe defined as any estimated frequency lower than the lowest endpoint. Also, a second fringe interval is defined by the highest endpoint and beyond. Typically, the estimated frequency Q falls between two defined endpoints. In fact, intervals should be selected such that normally occurring frequencies do not lie within either fringe interval.

After selecting the appropriate interval, the Q value's displacement within that interval is determined. In displacement calculation step 60, the variable X is assigned a value which gives the estimated frequency's percentage displacement within the selected interval. The values of X range between zero and one. The displacement value is calculated by subtracting the estimated frequency Q from the higher endpoint then dividing the difference by the distance between the two endpoints (that distance equaling the frequency of the higher endpoint minus the frequency of the lower endpoint). The processor uses the displacement value to calculate a new correction factor.

The processor computes the new correction factor in correction calculation step 62. The new correction factor K is defined as the sum of the correction factor of the lower endpoint value and the displacement factor. Specifically, the displacement factor is derived by subtracting the correction value of the lower endpoint from the correction value associated with the higher endpoint and multiplying that difference by the displacement value X. The new value of K is derived by subtracting the displacement factor from the correction value associated with the higher endpoint value. In equation form:

$$K = COR_B - [X*(COR_B - COR_A]$$

with $COR_A$ representing the correction value associated with the lower endpoint and $COR_B$ representing the correction value associated with the higher endpoint. In the preferred embodiment of the present invention, the calculation of K's value is done differently depending on which endpoint has a higher correction value associated with it (see Appendix A, comments on bottom of page 6). The new correction factor K's value indicates the error of the measured frequency.

Lastly, in correction factor change section 72, pulse reset step 73 is executed. Step 73 assigns Q the value of 0, thus resetting counter Q for another iteration of input loop 72. Then the processor cycles to step 42, restarting input loop 70. The variable S is not reset to 0 because it indicates a fractional pulse which should be accounted for.

In the preferred embodiment, the processor performs the input loop 70 of the linearization flow chart once every second. However, it would be obvious to one skilled in the art that a different sampling rate could be used and still be within the teachings of the present invention. By the foregoing method, the processor is able to correct the stream of input pulses and send the counter linearized output pulses.

In the preferred embodiment, the intervals are defined by the standard behavior of the flow meter type which a particular implementation is designed for. Thus, a particular flow meter is proven, and from the tests a deviation curve is determined. The deviation curve is then broken into intervals. The selection of interval endpoints depends on the specific operating characteristics of the flow meter. Endpoints are chosen such that the lines defined by those endpoint's deviations most closely match the deviation curve between those endpoints. The specific endpoint selection method chosen is influenced by the number of endpoints which can be utilized by the processor and the shape of the flow meter's deviation curve. Another possible embodiment would have both the calibration values and the endpoint values dynamically stored. However, for most standardized applications, having predetermined endpoint values achieves the desired results.

While this invention has been described as having a preferred design it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

We claim:

1. In a fuel dispensing apparatus having a flow meter and a liquid flow line, an apparatus for adjusting the measured flow rate of said flow meter to correct for the non-linear output signals of said flow meter, said apparatus comprising:

a flow meter having a rotor, said flow meter adapted to measure the flow rate of a liquid flow line as a function of the rotational velocity of said rotor;

an output means, coupled to said flow meter, for generating signals at a rate which is proportional to the rotational velocity of said rotor, and providing an output frequency;

memory means for storing a plurality of calibration values, each one of said calibration values being associated with a frequency which is an endpoint of a prefined interval, such that each of said intervals has a lower and a higher endpoint value;

processor means, coupled to said output means and said memory means, for linearizing said output frequency by using a predetermined correction factor to produce an estimated frequency, said processor periodically recalculating said correction factor by selecting an appropriate interval containing said estimated frequency, then determining the relative displacement of said estimated frequency within said interval, the relative displacement being defined as the difference of the upper endpoint and the estimated frequency which is divided by the length of the interval, then calculating a new correction factor (K) using the equation:

$$K = KB - [X*(KB - KA)]$$

with KA being the calibration factor associated with the lower endpoint value of said interval, X being said relative displacement, and KB being the calibration factor associated with said higher endpoint value.

2. The apparatus as described in claim 1 wherein said memory means comprises a non-volatile memory.

3. The apparatus as described in claim 1 wherein said memory means comprises random-access-memory circuits (RAM).

4. The apparatus as described in claim 3 wherein said RAM circuits have a back-up power device.

5. The apparatus as described in claim 4 further comprising an input means for receiving new calibration value pairs and storing said pairs in said RAM, said calibration value pairs comprising a calibration factor and an endpoint value.

6. The apparatus as described in claim 5 wherein said input means also has the ability to receive a single calibration offset value such that every value is shifted by said offset value.

7. In a fuel dispensing apparatus having a fuel line, a system for accurately determining a flow rate of the fuel line, said system comprising:

a turbine meter coupled to the fuel line having a pulse emitting means for transmitting a pulse stream having a frequency proportional to said flow rate;

a memory for storing a plurality of calibration values, each one of said calibration values associated with a frequency which is an endpoint of a predefined interval, such that each of said intervals has a lower and a higher endpoint value;

a processor coupled to said turbine meter pulse emitting means and said memory for observing said pulse stream such that for every pulse from said meter a predetermined correction factor is summed by said processor to determine said estimated frequency, said processor periodically recalculating said predetermined correction factor by selecting an appropriate interval containing said estimated frequency within said interval, the relative displacement being defined as the difference of the upper endpoint and the estimated frequency which is divided by the length of the interval, then calculating a new correction factor (K) using the equation:

$$K = KB - [X*(KB - KA)]$$

with KA being the calibration factor associated with the lower endpoint value of said interval, X being said relative displacement, and KB being the calibration factor associated with said higher endpoint value, then replacing said predetermined correction factor with the value of said new correction factor.

8. The apparatus as described in claim 7 wherein said memory comprises a non-volatile memory.

9. The apparatus as described in claim 7 wherein said memory comprises random-access memory (RAM).

10. The apparatus as described in claim 9 wherein said RAM further comprises a battery backed-up memory.

11. The apparatus as described in claim 7 further comprising an input means for receiving new calibration value pairs and storing said pairs in said memory, said calibration value pairs comprising a calibration factor and an endpoint value.

12. The apparatus as described in claim 11 wherein said input means also has the ability to receive a single calibration offset value such that every calibration factor is shifted by said offset value.

13. In a flow meter apparatus, a method of producing a linearized stream of output pulses, comprising the repetitive steps of:

checking for an input pulse wherein if the recent occurrence of an input pulse is detected, a predetermined correction factor is added to an input pulse counter and overflow is checked for, else a cycle check is performed;

said overflow checking wherein if the presence of an overflow flag is determined, an output pulse is sent and a frequency counter is incremented by one and then performing said cycle check; else said cycle check is performed;

said cycle check wherein if a predetermined period has elapsed, a new correction factor is calculated by:
- selecting two known frequencies having the current value of said frequency counter within the interval which is determined by said known frequencies, and having calibration factors associated with said known frequencies;
- determining the relative displacement of the value of said input counter within said interval, the relative displacement being defined as the difference of the upper endpoint and the input counter which is divided by the length of the interval;
- calculating a new correction factor (K) using the equation:

$$K = KB - [X*(KB - KA)]$$

with KA being the calibration factor associated with said known frequency having a lower value, X being said relative displacement, and KB being the calibration factor associated with said known frequency having a higher value;
- resetting said frequency counter to zero;
- performing said input pulse checking; else said input pulse checking is performed.

14. The method described in claim 13 wherein said predetermined period is approximately one second.

15. The method as described in claim 13 further comprising an initialization step performed previous to said repetitive steps wherein said initialization step comprises setting said input pulse counter and said frequency counter to zero and setting said correction factor to a calibration factor associated with the lowest of said known frequencies.

* * * * *

UNITED STATES PATENT AND TRADEMARK OFFICE
CERTIFICATE OF CORRECTION

PATENT NO.  :   5,016,187
DATED       :   May 14, 1991
INVENTOR(S) :   Maurice J. Forkert et al It is certified that error appears in the above-identified patent and that said Letters Patent is hereby corrected as shown below:

Column 8, Line 36, delete "($COR_B-COR_A$]" and substitute therefor --($COR_B-COR_A$)]--.

Column 8, Line 47, after "frequency" insert --, and is dynamically stored in RAM 28--.

Claim 1, Column 9, Line 38, delete "prefined" and substitute therefor --predefined--.

Claim 7, Column 10, Line 27, after "frequency" insert --, then determining the relative displacement of said estimated frequency--.

Signed and Sealed this

Sixth Day of October, 1992

Attest:

DOUGLAS B. COMER

Attesting Officer

Acting Commissioner of Patents and Trademarks